United States Patent
Chang et al.

(10) Patent No.: US 6,667,118 B1
(45) Date of Patent: Dec. 23, 2003

(54) TEXTURE-INDUCED MAGNETIC ANISOTROPY OF SOFT UNDERLAYERS FOR PERPENDICULAR RECORDING MEDIA

(75) Inventors: Chung-Hee Chang, Fremont, CA (US); Rajiv Yadav Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 4 days.

(21) Appl. No.: 09/911,738

(22) Filed: Jul. 25, 2001

Related U.S. Application Data

(60) Provisional application No. 60/230,003, filed on Sep. 5, 2000.

(51) Int. Cl.[7] .............................. G11B 5/66; G11B 5/70; B05D 5/12; C23C 14/32
(52) U.S. Cl. .................... 428/694 TM; 428/694 TS; 428/900; 428/216; 428/336; 204/192.1; 204/192.2; 427/129; 427/131; 427/132
(58) Field of Search .................... 427/129, 131, 427/132; 204/192.1, 192.2; 428/900, 694 TM, 694 TS, 216, 336

(56) References Cited

U.S. PATENT DOCUMENTS

| | | | |
|---|---|---|---|
| 4,762,742 A | 8/1988 | Sonoda et al. | 428/141 |
| 4,950,548 A * | 8/1990 | Furusawa et al. | 428/611 |
| 5,525,398 A | 6/1996 | Takai et al. | 428/141 |
| 5,589,262 A | 12/1996 | Kiuchi et al. | 428/336 |
| 5,612,146 A | 3/1997 | Komura et al. | 428/694 T |
| 5,815,342 A | 9/1998 | Akiyama et al. | 360/97.01 |
| 5,861,220 A | 1/1999 | Coughlin | 428/694 TM |
| 5,942,342 A | 8/1999 | Hikosaka et al. | 428/694 R |
| 6,037,069 A | 3/2000 | Ataka et al. | 428/694 TS |
| 6,083,599 A | 7/2000 | Hirayama et al. | 428/65.3 |
| 6,087,027 A | 7/2000 | Hoshiya et al. | 428/692 |
| 6,127,053 A | 10/2000 | Lin et al. | 428/692 |
| 6,180,202 B1 | 1/2001 | Lee | 428/65.3 |
| 6,204,474 B1 * | 3/2001 | Xuan | 219/121.77 |
| 6,248,416 B1 * | 6/2001 | Lambeth et al. | 428/65.3 |
| 2002/0028357 A1 * | 3/2002 | Shukh et al. | 428/694 TM |

FOREIGN PATENT DOCUMENTS

JP 404176021 A 6/1992

\* cited by examiner

Primary Examiner—Holly Rickman
(74) Attorney, Agent, or Firm—McDermott, Will & Emery

(57) ABSTRACT

Perpendicular magnetic recording media having no, or substantially reduced, Barkhausen noise are manufactured by a method comprising steps of:
(a) providing a non-magnetic substrate having a surface;
(b) providing the surface of the substrate with a unidirectional texture pattern;
(c) forming an underlayer of a soft magnetic material over the unidirectional texture pattern, the layer of soft magnetic material having positive magnetostriction and uniaxial magnetic anisotropy and including a multiplicity of magnetic domains; and
(d) forming a magnetic recording layer of a hard magnetic material over the underlayer;
wherein the uniaxial magnetic anisotropy of the underlayer of soft magnetic material is sufficiently large to orient the magnetic domains thereof along the axis of the uniaxial magnetic anisotropy and thereby restrict domain wall formation and/or movement, whereby generation of Barkhausen noise in the soft underlayer is suppressed.

16 Claims, 2 Drawing Sheets

TEXTURE-INDUCED MAGNETIC ANISOTROPY OF SOFT UNDERLAYERS FOR PERPENDICULAR RECORDING MEDIA

CROSS-REFERENCE TO PROVISIONAL APPLICATION

This application claims priority from U.S. provisional patent application Serial No. 60/230,003, filed Sep. 5, 2000, the entire disclosure of which is incorporated herein by reference.

FIELD OF THE INVENTION

The present invention relates to an improved method for forming soft magnetic underlayers for magnetic recording media having uniaxial anisotropy and to improved magnetic recording media including such uniaxially anisotropic soft magnetic underlayers. The present invention is of particular utility in the manufacture of high areal recording density perpendicular magnetic recording media, e.g., hard disks, which exhibit substantially reduced Barkhausen noise.

BACKGROUND OF THE INVENTION

Magnetic media are widely used in various applications, particularly in the computer industry, and efforts are continually made with the aim of increasing the recording density, i.e., bit density of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer, i.e., a magnetic layer having relatively low coercivity, such as of a NiFe alloy (Permalloy), between the non-magnetic substrate, e.g., of glass, aluminum (Al) or an Al-based alloy, and the "hard" magnetic recording layer, e.g., of a cobalt-based alloy (e.g., a Co—Cr alloy) having perpendicular anisotropy. The magnetically soft underlayer serves to guide magnetic flux emanating from the head through the hard, perpendicular magnetic recording layer. In addition, the magnetically soft underlayer reduces susceptibility of the medium to thermally-activated magnetization reversal by reducing the demagnetizing fields which lower the energy barrier that maintains the current state of magnetization.

A typical perpendicular recording system 10 utilizing a vertically oriented magnetic medium 1 with a relatively thick soft magnetic underlayer, a relatively thin hard magnetic recording layer, and a single-pole head is illustrated in FIG. 1, wherein reference numerals 2, 3, 4, and 5, respectively, indicate the substrate, soft magnetic underlayer, at least one non-magnetic interlayer, and vertically oriented, hard magnetic recording layer of perpendicular magnetic medium 1, and reference numerals 7 and 8, respectively, indicate the single and auxiliary poles of single-pole magnetic transducer head 6. Relatively thin interlayer 4 (also referred to as an "intermediate" layer), comprised of one or more layers of non-magnetic materials, serves to (1) prevent magnetic interaction between the soft underlayer 3 and the hard recording layer 4 and (2) promote desired microstructural and magnetic properties of the hard recording layer. As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 5 in the region above single pole 7, entering and travelling along soft magnetic underlayer 3 for a distance, and then exiting therefrom and passing through vertically oriented, hard magnetic recording layer 5 in the region above auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) formed over hard magnetic layer 5, and a lubricant topcoat layer, such as of a perfluoropolyethylene material, formed over the protective overcoat layer. Substrate 2 is typically disk-shaped and comprised of a non-magnetic metal or alloy, e.g., Al or an Al-based alloy, such as Al—Mg having an NiP plating layer on the deposition surface thereof, or substrate 2 is comprised of a suitable glass, ceramic, glass-ceramic, polymeric material, or a composite or laminate of these materials; underlayer 3 is typically comprised of an about 2,000 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; and hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magnetocrystalline anisotropy ($1^{st}$ type) and interfacial anisotropy ($2^{nd}$ type).

A significant problem and drawback associated with the utilization of soft magnetic underlayers, such as layer 3 shown in FIG. 1, is the generation of noise resulting from, inter alia, pinning and unpinning (i.e., motion) of the magnetic domain walls thereof, termed "Barkhausen noise", which noise adversely affects performance characteristics of magnetic media, particularly high bit density magnetic media.

Accordingly, there exists a need for an improved method for manufacturing high bit density perpendicular magnetic information/data recording, storage, and retrieval media including magnetically soft underlayers, but which exhibit no, or at least substantially reduced, Barkhausen noise. In addition, there exists a need for improved, high bit density perpendicular magnetic recording media employing magnetically soft underlayers which exhibit no, or at least substantially reduced, Barkhausen noise, which media can be readily and economically fabricated by means of conventional manufacturing techniques and instrumentalities.

The present invention addresses and solves problems attendant upon the use of magnetically soft underlayers in the manufacture of high bit density perpendicular magnetic media, e.g., generation of Barkhausen noise, while maintaining all structural and mechanical aspects of high bit density recording technology. Moreover, the magnetic media of the present invention can be fabricated by means of conventional manufacturing techniques, e.g., sputtering.

DISCLOSURE OF THE INVENTION

An advantage of the present invention is an improved method of manufacturing a magnetic recording medium having no, or at least substantially reduced, Barkhausen noise.

Another advantage of the present invention is an improved method of manufacturing a high areal density, perpendicular magnetic recording medium wherein Barkhausen noise is at least substantially suppressed.

Still another advantage of the present invention is an improved magnetic recording medium with no, or at least substantially reduced, Barkhausen noise.

Yet another advantage of the present invention is an improved high areal density, perpendicular magnetic recording medium wherein Barkhausen noise is at least substantially suppressed.

A still further advantage of the present invention is an improved disk drive comprising an improved high areal density, perpendicular magnetic recording medium having suppressed Barkhausen noise.

Additional advantages, aspects, and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a magnetic recording medium having no, or at least substantially reduced, Barkhausen noise, comprising the sequential steps of:

(a) providing a non-magnetic substrate having a surface;

(b) providing the surface of the substrate with a unidirectional texture pattern;

(c) forming an underlayer of a soft magnetic material over the unidirectional texture pattern, the layer of soft magnetic material having positive magnetostriction and uniaxial magnetic anisotropy and including a multiplicity of magnetic domains; and (d) forming a magnetic recording layer of a hard magnetic material over the underlayer;

wherein the uniaxial magnetic anisotropy of the underlayer of soft magnetic material is sufficiently large to orient the magnetic domains thereof along the axis of uniaxial magnetic anisotropy and thereby restrict domain wall formation and/or movement, whereby generation of Barkhausen noise in the soft underlayer is suppressed.

According to embodiments of the present invention, step (a) comprises providing a disk-shaped substrate having a pair of opposed surfaces; step (b) comprises providing at least one of the pair of surfaces of the disk-shaped substrate with a circumferentially extending texture pattern; step (c) comprises forming an underlayer of a soft magnetic material having radial uniaxial magnetic anisotropy over the texture pattern; and step (d) comprises forming a layer of a hard magnetic material having perpendicular magnetic anisotropy.

In accordance with particular embodiments of the present invention, step (a) comprises providing a disk-shaped substrate comprising a non-magnetic material selected from the group consisting of Al, Al-based alloys, NiP-plated Al, other non-magnetic metals, other non-magnetic alloys, glass, ceramics, polymers, glass-ceramics, and composites and/or laminates thereof, step (b) comprises mechanically texturing the at least one surface of the substrate, e.g., step (b) comprises mechanically texturing the at least one surface of the substrate utilizing a slurry of abrasive particles dispensed on an absorbent and compliant polishing pad or tape, to form a circumferentially oriented texture pattern comprising a plurality of concentric, circularly-shaped grooves extending to a depth below the substrate surface, adjacent grooves of the pattern being spaced apart a preselected distance; step (c) comprises forming an underlayer of a soft magnetic material selected from the group consisting of Ni, NiFe, Co, CoZr, CoZrCr, CoZrNb, CoFe, Fe, FeN, FeSiAl, FeSiAlN, etc., e.g., step (c) comprises forming an underlayer comprising a NiFe alloy having a Fe content from about 20 to about 60 wt. % and (111) texture, as by DC magnetron sputtering of a NiFe target having a Fe content from about 20 to about 60 wt. %; step (d) comprises forming a layer of hard magnetic material comprising Co alloyed with one or more elements selected from the group consisting of Cr, Fe, Ta, Ni, Mo, Pt, V, Nb, Ge, and B, an iron oxide, such as $Fe_3O_4$ and $\delta$-$Fe_2O_3$, or a $(CoX/Pd$ or $Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick.

According to further embodiments of the present invention, step (a) comprises providing a substrate comprised of NiP-plated Al; step (b) comprises mechanically texturing the at least one surface of the substrate utilizing a slurry containing abrasive particles having a size of from about 800 to about 2,500 Å to form a circumferentially oriented texture pattern comprising a plurality of concentric, circularly-shaped grooves extending below the substrate surface to a depth from about 50 to about 150 Å, adjacent grooves of the pattern being spaced apart 2,000 Å; step (c) comprises DC magnetron sputter depositing a magnetically soft underlayer of a NiFe alloy having a Fe content of from about 20 to about 60 wt. %, a thickness from about 2,000 to about 4,000 Å, (111) texture, and radial uniaxial magnetic anisotropy; and step (d) comprises forming a layer of a Co-based hard magnetic material having a thickness from about 100 to about 250 Å.

According to another aspect of the present invention, a magnetic recording medium wherein Barkhausen noise is at least substantially suppressed, comprises:

(a) a non-magnetic substrate having a surface including a unidirectional texture pattern;

(b) an underlayer of a soft magnetic material formed over the unidirectionally textured surface, the layer of soft magnetic material having positive magnetostriction and unniaxial magnetic anisotropy and including a plurality of magnetic domains; and (c) a magnetic recording layer of a hard magnetic material formed over the underlayer of soft magnetic material;

wherein the uniaxial magnetic anisotropy of the underlayer of soft magnetic material is sufficiently large to orient the magnetic domains thereof along the axis of uniaxial anisotropy and thereby restrict domain wall formation and/or movement, whereby generation of Barkhausen noise in the soft underlayer is suppressed.

According to embodiments of the present invention, substrate (a) is a disk-shaped substrate having a pair of opposed surfaces, and the unidirectional texture pattern is a mechanically formed, circumferentially oriented pattern comprising a plurality of concentric, circularly-shaped grooves; underlayer (b) of soft magnetic material is radially magnetically anisotropic; and magnetic recording layer (c) of hard magnetic material is perpendicularly magnetically anisotropic.

In accordance with particular embodiments of the present invention, substrate (a) comprises a non-magnetic material selected from the group consisting of Al, Al-based alloys, NiP-plated Al, other non-magnetic metals, other non-magnetic alloys, glass, ceramics, polymers, glass-ceramics, and composites and/or laminates thereof, and the circumferentially oriented texture pattern comprises a plurality of concentric, circularly-shaped grooves extending below the substrate surface to a depth from about 50 to about 150 Å, with adjacent grooves of the pattern being spaced apart about 2,000 Å; underlayer (b) of soft magnetic material comprises a material selected from the group consisting of Ni, NiFe, Co, CoZr, CoZrCr, CoZrNb, CoFe, Fe, FeN, FeSiAl, and FeSiAlN, and magnetic recording layer (c) of hard magnetic material comprises Co alloyed with one or more elements selected from the group consisting of Cr, Fe, Ta, Ni, Mo, Pt, V, Nb, Ge, and B, an iron oxide, such as $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick.

According to further embodiments of the present invention, substrate (a) comprises NiP-plated Al; underlayer (b) of soft magnetic material comprises a NiFe alloy having a Fe content of from about 20 to about 60 wt. %, a thickness from about 2,000 to about 4,000 Å and (111) texture; magnetic recording layer (c) of hard magnetic material has a thickness from about 100 to about 250 Å; and the magnetic recording medium further comprises: (d) a protective overcoat layer on the magnetic recording layer (c); and (e) a lubricant topcoat over the protective overcoat.

According to a further aspect of the present invention, a disk drive comprises the above-described disk-shaped perpendicular magnetic recording medium, wherein the easy axis of magnetization of the underlayer (b) of soft magnetic material is aligned in the radial direction of the disk-shaped substrate.

According to still another aspect of the present invention, a magnetic recording medium comprises:

(a) a non-magnetic substrate including a surface with a soft underlayer formed thereover; and (b) means for suppressing Barkhausen noise in the soft underlayer.

According to embodiments of the present invention, the magnetic recording medium further comprises a layer of a hard magnetic material having perpendicular anisotropy; the substrate is disk-shaped; and the surface of the substrate includes a circumferentially oriented texture pattern.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawing and description are to be regarded as illustrative in nature, and not limitative.

BRIEF DESCRIPTION OF THE DRAWINGS

The following detailed description of the embodiments of the invention can best be understood when read in conjunction with the following drawings, in which various layers are not drawn to scale, but rather are shown as to best illustrate the features of the present invention, wherein.

DESCRIPTION OF THE INVENTION

The present invention addresses and solves problems arising from the generation of Barkhausen noise in perpendicular-type magnetic recording media employing magnetically soft underlayers, e.g., of NiFe (Permalloy), due to motion of the magnetic domain walls. Specifically, the present invention is based upon the recognition that the orientation of the magnetic domains of the soft underlayer, hence domain wall formation and/or movement, can be controlled (i.e., restricted) by unixial anisotropy induced therein by means of appropriate uniaxial texturing of the surface of the non-magnetic substrate, which uniaxially induced anisotropy is sufficiently large as to orient the domain walls of the soft underlayer along the anisotropy axis.

A key feature of the present invention is induction of uniaxial anisotropy in a film or layer of a soft magnetic material utilized as an underlayer in a perpendicular magnetic recording medium, by forming the layer in an anisotropically stressed state, wherein the anisotropy results from magnetostriction, i.e., deformation of the ferromagnetic material when subjected to a magnetic field (a positive magnetostriction denoting an expansion of the material, and a negative magnetostriction denoting a contraction of the material). In the case of perpendicular recording media comprising soft magnetic films or layers formed on disk-shaped substrates, as by conventional magnetron sputtering techniques, several factors determine the anisotropy of the underlayer(s), including, inter alia, the shape, intensity, etc., of the magnetron's magnetic field; the magnetostriction characteristics of the particular material of the underlayer; and stress originating from the substrate shape and morphology (e.g., texture). Of these factors, the effects of magnetostriction and stress can be readily altered/controlled by changing the underlayer composition, substrate surface morphology, and deposition (e.g., sputtering) conditions. The present invention, therefore, is based upon the discovery by the present inventors that uniaxial anisotropy, such as radial uniaxial anisotropy, can be induced in magnetically soft underlayers deposited on uniaxially textured substrates, e.g., mechanically textured substrates, which uniaxial anisotropy can restrict domain wall formation and/or movement therein, thereby eliminating, or at least substantially reducing, Barkhausen noise in the soft underlayer.

Figure 1:
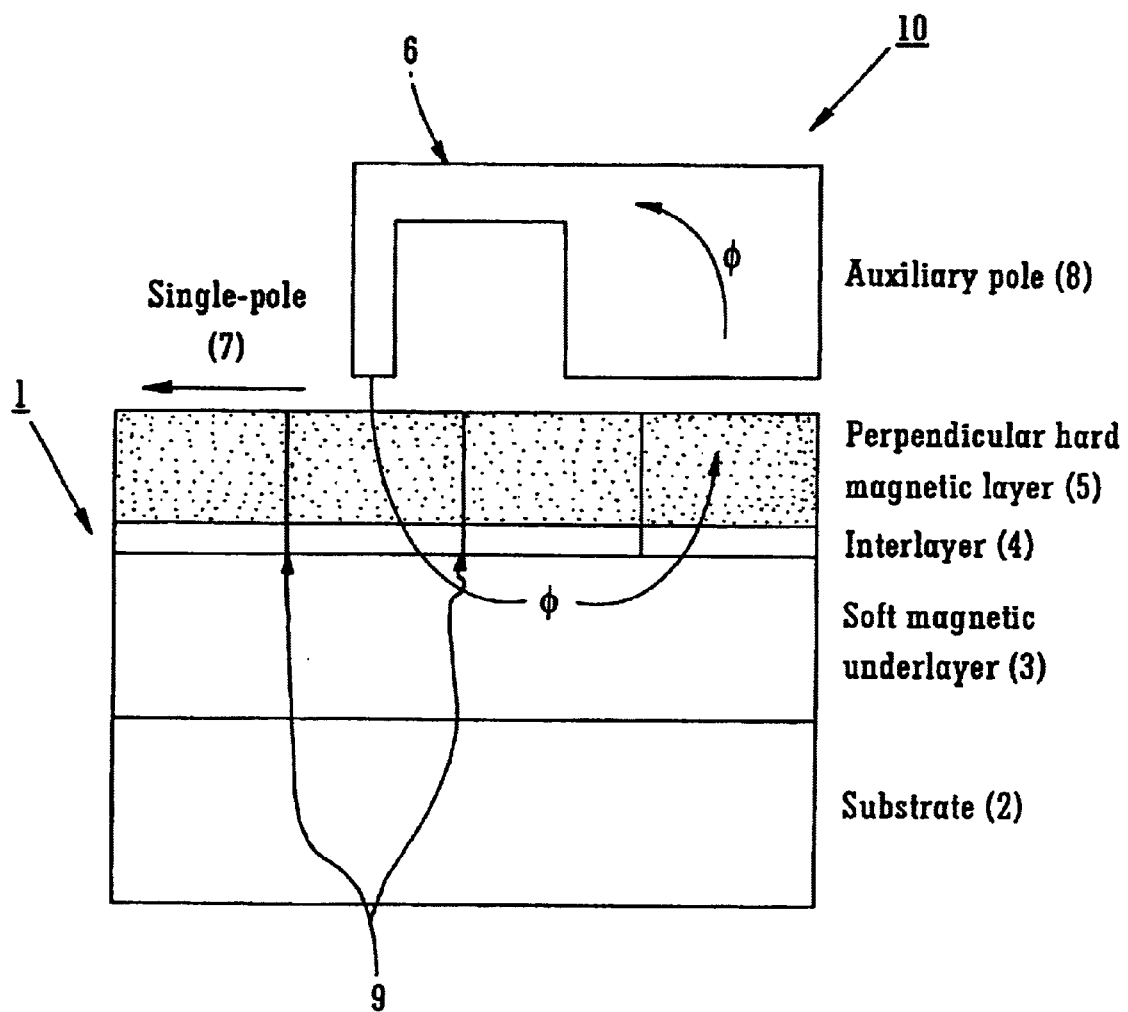
FIG. 1 schematically illustrates, in simplified, cross-sectional view, a magnetic recording, storage, and retrieval system comprised of a conventional perpendicular-type magnetic recording medium including a magnetically soft underlayer and a single-pole transducer head.

Improved perpendicular magnetic recording media fabricated according to the inventive methodology comprise substrates 2, soft magnetic underlayers 3, at least one non-magnetic interlayer 4, and perpendicularly oriented, magnetically hard layers 5 composed of the same, or at least similar, materials of similar thicknesses as in the conventional perpendicular medium 1 illustrated in FIG. 1 and described supra. However, according to the present invention, an improved sequence of fabrication steps is provided for manufacturing a perpendicular magnetic recording medium having no, or at least substantially reduced, Barkhausen noise, which steps include: (1) providing a non-magnetic substrate having a surface of preselected smoothness; (2) providing the surface of the substrate with a unidirectional texture pattern; (3) forming an underlayer of a soft magnetic material over the unidirectional texture pattern, the layer of soft magnetic material having positive magnetostriction and uniaxial magnetic anisotropy; and (4) forming a magnetic recording layer of a hard magnetic material over the underlayer, the magnetic recording layer including a multiplicity of magnetic domains; wherein the uniaxial magnetic anisotropy of the underlayer of soft magnetic material is sufficiently large as to orient the magnetic domains thereof along the axis of uniaxial magnetic anisotropy, thereby pinning the magnetic domains so as to prevent formation and/or movement of the domain walls, whereby generation of Barkhausen noise in the soft underlayer is suppressed.

More specifically, according to embodiments of the present invention, a first step comprises providing a disk-shaped substrate, composed of a material selected from among those utilized in the fabrication of conventional perpendicular magnetic recording media described supra, the substrate having a pair of opposed, smooth surfaces; in a second step according to the invention, at least one of the pair of surfaces of the disk-shaped substrate is provided with a unidirectionally (i.e., circumferentially) extending texture pattern; an underlayer of a soft magnetic material having positive magnetostriction and radial uniaxial magnetic anisotropy is formed over the circumferentially extending texture pattern in a third step, as by magnetron sputtering; and a layer of a hard magnetic material having perpendicular magnetic anisotropy is formed over the soft magnetic layer in a later step, wherein the radially uniaxial anisotropy of the magnetically soft underlayer orients the magnetic domains of the latter along the axis of uniaxial anisotropy, thereby restricting domain wall formation and/or movement, whereby generation of Barkhausen noise in the soft underlayer is suppressed.

In accordance with particular embodiments of the present invention, the first step comprises providing a disk-shaped substrate comprising a non-magnetic material selected from the group consisting of Al, Al-based alloys, NiP-plated Al, other non-magnetic metals, other non-magnetic alloys, glass, ceramics, polymers, glass-ceramics, and composites and/or laminates thereof; the second step comprises mechanically unidirectionally circumferentially texturing the at least one surface of the substrate, e.g., by utilizing a slurry of abrasive particles dispensed on an absorbent and compliant polishing pad or tape, such as a slurry containing abrasive particles having a size of from about 800 to about 2,500 Å to form a circumferentially oriented texture pattern comprising a plurality of concentric, circularly-shaped grooves extending below the substrate surface to a depth from about 50 to about 150 Å, adjacent grooves of the pattern being spaced apart about 2,000 Å; the third step comprises forming an underlayer of a soft magnetic material selected from the group consisting of Ni, NiFe, Co, CoZr, CoZrCr, CoZrNb, CoFe, Fe, FeN, FeSiAl, FeSiAlN, etc., the underlayer having a thickness similar to that utilized in the conventional perpendicular medium of FIG. 1, e.g., from about 2,000 to about 4,000 Å. By way of illustration only, the third step may comprise forming an underlayer comprising a NiFe alloy having a Fe content from about 20 to about 60 wt. % and (111) texture, by DC magnetron sputtering of a NiFe target having a Fe content from about 20 to about 60 wt. %; and the fourth step comprises forming (by any convenient technique, e.g., sputtering) a layer of hard magnetic material comprising Co alloyed with one or more elements selected from the group consisting of Cr, Fe, Ta, Ni, Mo, Pt, V, Nb, Ge, and B, an iron oxide, such as $Fe_3O_4$ and $\delta$-$Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick, with the thickness of the hard magnetic layer being similar to that of the conventional medium shown in FIG. 1, i.e., from about 100 to about 250 Å. Protective overcoat and lubricant topcoat layers are then successively formed over the hard magnetic layer, as by conventional techniques, e.g., sputtering and dipping, respectively.

Figure 2:
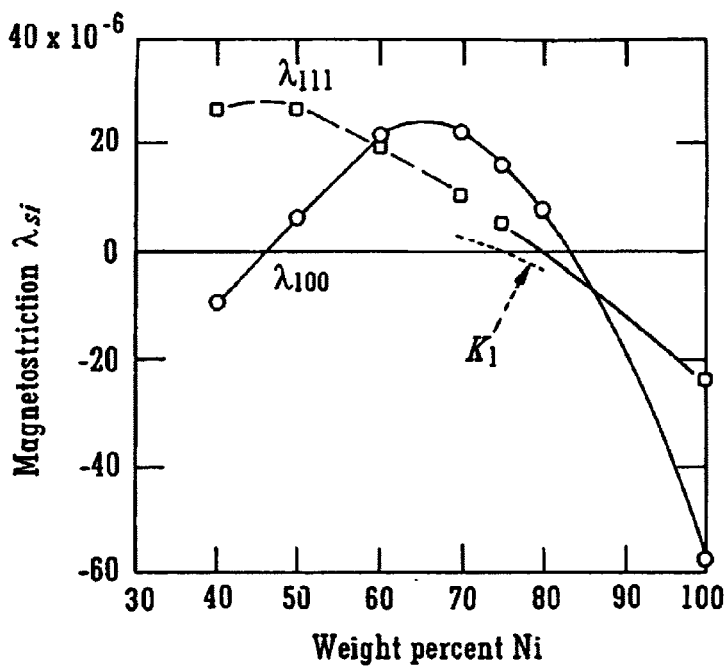
FIG. 2 is a graph showing the variation, of magnetostriction of magnetically soft NiFe alloys with Ni content.

The above-described technique works well with magnetic alloys having positive magnetostriction, e.g., NiFe (Permalloy) alloys with greater than about 20 wt. % Fe. For example, the graph of FIG. 2 indicates that NiFe alloys with (111) texture exhibit positive magnetostriction for Fe content in the range of from about 20 to about 60 wt. %. In addition, the inventive methodology requires substrate textures which provide overlying soft magnetic layers with uniaxial anisotropic stress, as by mechanical formation of a pattern of circumferentially extending grooves in the surface of a smooth-faced substrate. A high roughness (e.g., from about 3 to about 5 Å and high groove density (e.g., 5 grooves/$\mu$m) are preferred; however, the roughness of the starting substrate must match the requirements of head flyability in order to provide a desired head-to-medium spacing.

EXAMPLE

Figure 3A:
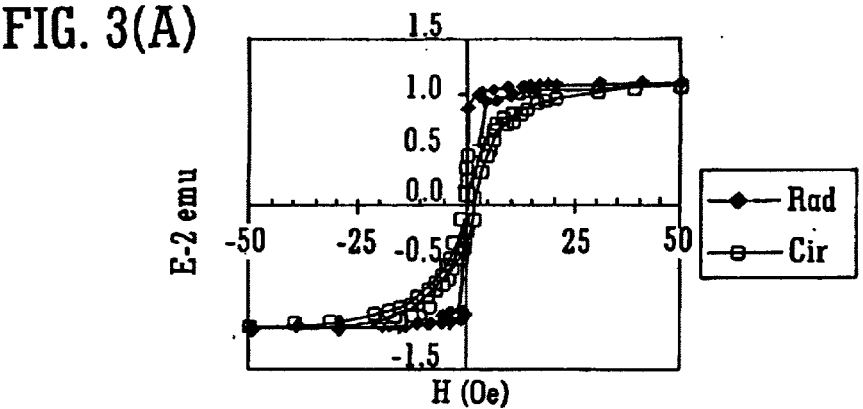
FIGS. 3(A)–3(B) are magnetic hysteresis loops, measured in radial and circumferential directions, obtained for magnetron sputtered NiFe40 films formed on disk-shaped substrates of textured Al/NiP and very smooth glass, respectively.
Figure 3B:
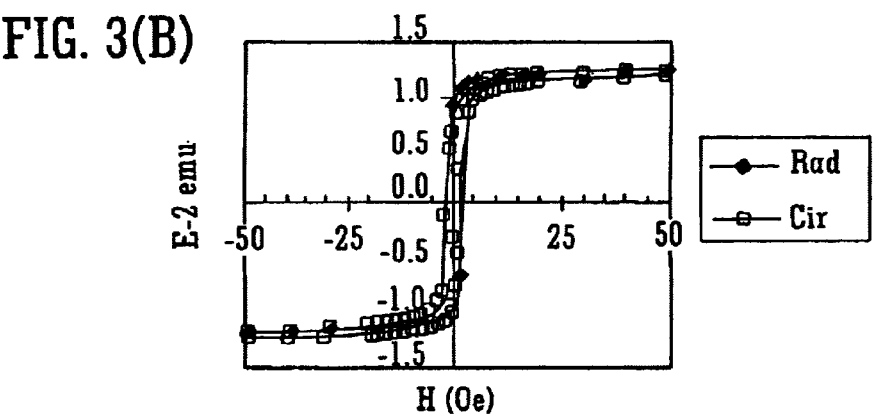

A single-disk type sputtering apparatus was used for depositing NiFe alloy films on substrates as soft magnetic underlayers. The diameters of the magnetron sputtering source and disk substrates were 7 inches and 84 mm, respectively. Sputtering of the NiFe films was performed in Ar atmospheres at pressures of from about 3 to about 6 mTorr, using from about 1.5 to about 4 kW DC power. Magnetic hysteresis loops of the deposited films were measured in the radial and circumferential directions using a vibrating sample magnetometer. By way of illustration, FIGS. 3(A) and 3(B) show the hysteresis loops for an about 4,000 Å thick NiFe40 film sputtered onto the surfaces of unheated substrates at about 1.5 kW sputtering power at an Ar pressure of about 6 mTorr. More specifically, FIG. 3(A) illustrates the hysteresis loops for a NiFe40 film formed on a mechanically circumferentially textured Al/NiP substrate, whereas FIG. 3(B) shows the hysteresis loops for a NiFe40 film sputtered under same conditions onto a smooth-surfaced glass substrate. As is evident from the figures, the NiFe40 soft magnetic underlayer deposited on the mechanically circumferentially textured Al/NiP substrate shows radial anisotropy, whereas the NiFe40 film formed on the smooth glass substrate is isotropic. Inasmuch as the NiFe soft magnetic underlayer formed on the radially mechanically textured Al/NiP substrate of FIG. 3(A) will have a radially directed magnetic anisotropy which induces the magnetic domains thereof to take on an orientation along the axis of magnetic anisotropy, domain wall formation and/or movement will be restricted. As a consequence, a perpendicular magnetic recording medium fabricated therefrom will exhibit at least substantial, if not complete, suppression of Barkhausen noise. A corresponding suppression of Barkhausen noise will not be observed with perpendicular media formed utilizing the isotropic laminate of FIG. 3(B) due to lack of domain wall pinning.

Thus, the present invention advantageously provides improved, high bit density, perpendicular magnetic data/information recording, storage, and retrieval media including a uniaxially anisotropic, magnetically soft underlayer in which domain wall formation and/or motion is restricted. As a consequence, the inventive methodology effectively eliminates, or at least suppresses, the generation of Barkhausen-type noise associated with high bit density, perpendicular magnetic media utilizing conventional magnetically soft underlayers. The media of the present invention are especially useful when employed in conjunction with single-pole recording/retrieval transducer heads and enjoy particular utility in high recording density media for computer-related applications. In addition, the inventive media can be readily fabricated by means of conventional methodologies, e.g., sputtering techniques.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A method of manufacturing a magnetic recording medium having reduced Barkhausen noise, comprising the sequential steps of:
   (a) providing a non-magnetic substrate having a surface;
   (b) providing said surface of said substrate with a unidirectional texture pattern;
   (c) forming an underlayer of a soft magnetic material over said unidirectional texture pattern, said layer of soft magnetic material having positive magnetostriction and uniaxial magnetic anisotropy and including a plurality of magnetic domains; and
   (d) forming a magnetic recording layer of a hard magnetic material over said underlayer;

wherein said uniaxial magnetic anisotropy of said underlayer of soft magnetic material is sufficiently large as to orient said magnetic domains thereof along the axis of said uniaxial magnetic anisotropy and thereby restrict domain wall formation and/or movement, whereby generation of Barkhausen noise in said magnetic recording layer is suppressed.

2. The method according to claim 1, wherein:
step (a) comprises providing a disk-shaped substrate having a pair of opposed surfaces;
step (b) comprises providing at least one of said pair of surfaces of said disk-shaped substrate with a circumferentially extending texture pattern;
step (c) comprises forming an underlayer of a soft magnetic material having radial uniaxial magnetic anisotropy over said texture pattern; and
step (d) comprises forming a layer of a hard magnetic material having perpendicular magnetic anisotropy.

3. The method according to claim 2, wherein:
step (a) comprises providing a disk-shaped substrate comprising a non-magnetic material selected from the group consisting of Al, Al-based alloys, NiP-plated Al, other non-magnetic metals, other non-magnetic alloys, glass, ceramics, polymers, glass-ceramics, and composites and/or laminates thereof.

4. The method according to claim 2, wherein:
step (b) comprises mechanically texturing said at least one surface of said substrate.

5. The method according to claim 4, wherein:
step (b) comprises mechanically texturing said at least one surface of said substrate utilizing a slurry of abrasive particles dispensed on an absorbent and compliant polishing pad or tape.

6. The method according to claim 5, wherein:
step (b) comprises utilizing a slurry containing abrasive particles having a size of from about 800 to about 2,500 Å to form a circumferentially oriented texture pattern comprising a plurality of concentric, circularly-shaped grooves extending below said substrate surface to a depth from about 50 to about 150 Å, adjacent grooves of said pattern being spaced apart about 2,000 Å.

7. The method according to claim 2, wherein:
step (c) comprises forming an underlayer of a soft magnetic material selected from the group consisting of Ni, NiFe, Co, CoZr, CoZrCr, CoZrNb, CoFe, Fe, FeN, FeSiAl, and FeSiAlN.

8. The method according to claim 7, wherein:
step (c) comprises forming an underlayer comprising a NiFe alloy having a Fe content from about 20 to about 60 wt. % and (111) texture.

9. The method according to claim 8, wherein:
step (c) comprises forming said underlayer by DC magnetron sputtering of a NiFe target having a Fe content from about 20 to about 60 wt. %.

10. The method according to claim 2, wherein:
step (d) comprises forming a layer of hard magnetic material comprising Co alloyed with one or more elements selected from the group consisting of Cr, Fe, Ta, Ni, Mo, Pt, V, Nb, Ge, and B, an iron oxide selected from $Fe_3O_4$ and $\delta\text{-}Fe_2O_3$ or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick.

11. The method according to claim 2, wherein:
step (a) comprises providing a substrate comprised of NiP-plated Al;
step (b) comprises mechanically texturing said at least one surface of said substrate utilizing a slurry containing abrasive particles having a size of from about 800 to about 1,500 Å to form a circumferentially oriented texture pattern comprising a plurality of concentric, circularly-shaped grooves extending below said substrate surface to a depth from about 50 to about 150 Å, adjacent grooves of said pattern being spaced apart about 2,000 Å;
step (c) comprises DC magnetron sputter depositing a magnetically soft underlayer of a NiFe alloy having a Fe content of from about 20 to about 60 wt. %, a thickness from about 2,000 to about 4,000 Å, (111) texture, and radial uniaxial magnetic anisotropy; and
step (d) comprises forming a layer of a Co-based hard magnetic material having a thickness from about 100 to about 250 Å.

12. A magnetic recording medium having reduced Barkhausen noise, comprising:
(a) a non-magnetic substrate having a surface including a unidirectional texture pattern;
(b) an underlayer of a soft magnetic material formed over said unidirectionally textured surface, said layer of soft magnetic material having positive magnetostriction and uniaxial magnetic anisotropy and including a plurality of magnetic domains; and
(c) a magnetic recording layer of a hard magnetic material formed over said underlayer of soft magnetic material;
wherein said uniaxial magnetic anisotropy of said underlayer of soft magnetic material is sufficiently large to orient said magnetic domains thereof along said axis of said uniaxial anisotropy and restrict domain wall formation and/or movement, whereby generation of Barkhausen noise in said soft underlayer is suppressed.

13. The magnetic recording medium as in claim 12, wherein:
substrate (a) is a disk-shaped substrate having a pair of opposed surfaces, and said unidirectional texture pattern is a mechanically formed, circumferentially oriented pattern comprising a plurality of concentric, circularly-shaped grooves;
underlayer (b) of soft magnetic material is radially magnetically anisotropic;
and magnetic recording layer (c) of hard magnetic material is perpendicularly magnetically anisotropic.

14. The magnetic recording medium as in claim 13, wherein:
substrate (a) comprises a non-magnetic material selected from the group consisting of Al, Al-based alloys, NiP-plated Al, other non-magnetic metals, other non-magnetic alloys, glass, ceramics, polymers, glass-ceramics, and composites and/or laminates thereof, and said circumferentially oriented texture pattern comprises a plurality of concentric, circularly-shaped grooves extending below said substrate surface to a depth from about 50 to about 150 Å, with adjacent grooves of said pattern being spaced apart about 2,000 Å;
underlayer (b) of soft magnetic material comprises a material selected from the group consisting of Ni, NiFe, Co, CoZr, CoZrCr, CoZrNb, CoFe, Fe, FeN, FeSiAl, and FeSiAlN, and
magnetic recording layer (c) of hard magnetic material comprises Co alloyed with one or more elements selected from the group consisting of Cr, Fe, Ta, Ni, Mo, Pt, V, Nb, Ge, and B, an iron oxide selected from $Fe_3O_4$ and $\delta\text{-}Fe_2O_3$, or a $(CoX/Pd \text{ or } Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick.

15. The magnetic recording medium as in claim 14, wherein:
substrate (a) comprises NiP-plated Al;
underlayer (b) of soft magnetic material comprises a NiFe alloy having a Fe content of from about 20 to about 60 wt. %, a thickness from about 2,000 to about 4,000 Å and (111) texture;
magnetic recording layer (c) of hard magnetic material has a thickness from about 100 to about 250 Å; and said medium further comprises:
(d) a protective overcoat layer on said magnetic recording layer (c); and
(e) a lubricant topcoat over said protective overcoat.

16. A disk drive comprising the perpendicular magnetic recording medium of claim 13, wherein the easy axis of magnetization of said underlayer
(b) of soft magnetic material is aligned in the radial direction of disk-shaped substrate.

* * * * *